(12) United States Patent
Dhar

(10) Patent No.: US 12,530,206 B2
(45) Date of Patent: Jan. 20, 2026

(54) SYSTEM TO FACILITATE FACTUALLY ACCURATE ONLINE DEBATES

(71) Applicant: Satyam Dhar, San Francisco, CA (US)

(72) Inventor: Satyam Dhar, San Francisco, CA (US)

( * ) Notice: Subject to any disclaimer, the term of this patent is extended or adjusted under 35 U.S.C. 154(b) by 76 days.

(21) Appl. No.: 18/196,448

(22) Filed: May 12, 2023

(65) Prior Publication Data

US 2024/0378064 A1   Nov. 14, 2024

(51) Int. Cl.
*G06F 3/048* (2013.01)
*G06F 3/16* (2006.01)
*G06F 9/451* (2018.01)

(52) U.S. Cl.
CPC .............. *G06F 9/451* (2018.02); *G06F 3/165* (2013.01)

(58) Field of Classification Search
CPC ................................. G06F 9/451; G06F 3/165
See application file for complete search history.

(56) References Cited

U.S. PATENT DOCUMENTS

| | | | | |
|---|---|---|---|---|
| 10,268,360 B2 * | 4/2019 | Jones | ...................... | G06F 3/045 |
| 11,481,686 B1 * | 10/2022 | Yim | ...................... | G06F 3/0482 |
| 2008/0222279 A1 * | 9/2008 | Cioffi | ...................... | G06Q 10/10 |
| | | | | 709/223 |
| 2008/0263585 A1 * | 10/2008 | Gell | ................... | H04N 21/4788 |
| | | | | 725/32 |
| 2009/0254842 A1 * | 10/2009 | Leacock | ............. | G06F 3/04815 |
| | | | | 715/757 |
| 2009/0292738 A1 * | 11/2009 | Hurwitz | ................ | G06F 3/0482 |
| 2013/0042186 A1 * | 2/2013 | Tranchina | .............. | G06Q 10/10 |
| | | | | 715/753 |
| 2013/0266927 A1 * | 10/2013 | Mann | ...................... | A63F 13/85 |
| | | | | 434/362 |
| 2014/0075465 A1 * | 3/2014 | Petrovic | ............ | H04N 21/8456 |
| | | | | 725/14 |
| 2016/0072862 A1 * | 3/2016 | Bader-Natal | ............ | H04N 7/15 |
| | | | | 715/755 |
| 2019/0306208 A1 * | 10/2019 | Robinson | .............. | G06F 40/279 |
| 2021/0345002 A1 * | 11/2021 | Underwood | ....... | H04N 21/2187 |
| 2022/0131979 A1 * | 4/2022 | Pham | ...................... | G10L 17/18 |
| 2022/0166953 A1 * | 5/2022 | Aher | ...................... | G06V 40/20 |
| 2022/0224554 A1 * | 7/2022 | Hassan | ................... | H04L 49/90 |
| 2023/0017859 A1 * | 1/2023 | Li | ........................... | H04L 65/65 |

(Continued)

FOREIGN PATENT DOCUMENTS

WO    WO-2021242510 A1 * 12/2021    ......... H04L 12/1822

*Primary Examiner* — Linh K Pham
(74) *Attorney, Agent, or Firm* — Imperium Patent Works LLP; Mark D. Marrello

(57) ABSTRACT

A system to facilitate factually accurate online debates includes a storage device, a processor communicatively coupled to the storage device, a first means for causing a first device to display a first user interface that includes a pass the microphone button that when selected causes the ability to communicate to be transferred from a first user to a second user, a second means for causing a second device to display a second user interface that includes a request the microphone button that when selected causes a microphone indicator to be displayed on the first user interface indicating that the second user has requested the ability to communicate, and a third means for causing a third device to display a third user interface includes an add a flag button that when selected causes a create flag form to be displayed on the third user interface.

12 Claims, 19 Drawing Sheets

DEBATE

(56) References Cited

U.S. PATENT DOCUMENTS

| | | | | |
|---|---|---|---|---|
| 2023/0097459 A1* | 3/2023 | Mkervali | ............ | H04L 12/1827 |
| | | | | 709/204 |
| 2023/0254352 A1* | 8/2023 | Chanda | ............... | H04L 65/1093 |
| | | | | 709/204 |
| 2023/0384913 A1* | 11/2023 | Hassan | ................. | H04L 51/216 |
| 2023/0394440 A1* | 12/2023 | Marshall | ................. | G06F 16/93 |
| 2024/0031533 A1* | 1/2024 | Hassan | ................. | H04N 7/152 |
| 2024/0053952 A1* | 2/2024 | Terata | ................... | H04L 65/403 |
| 2024/0146779 A1* | 5/2024 | Ayanoglu | ............. | H04N 5/2624 |

* cited by examiner

DEBATE

DEBATE CROSSTALK

DEBATE CROSSTALK BLOCKING

DEBATE REQUEST FOR MICROPHONE ACCESS

FLAG REGARDING A STATEMENT

DEBATE SYSTEM ARCHITECTURE

ACTIVE DEBATE PARTICIPANT USER INTERFACE

PASSIVE DEBATE PARTICIPANT USER INTERFACE

DEBATE VIEWER USER INTERFACE

FLAG CREATION USER INTERFACE

FLAG LISTING WITH VALIDATION SCORING

USER DEVICE

DEBATE CREATION FLOWCHART

PASS THE MICROPHONE FLOWCHART

```
                                    ← 70
                                                71
┌─────────────────────────────────────────────────────────┐
│ UPON BEGINNING THE DEBATE, A FIRST DEBATE PARTICIPANT ("ACTIVE │
│ PARTICIPANT)" IS GIVEN THE MICROPHONE TO SPEAK AND THE  │
│ MICROPHONE FOR ALL OTHER DEBATE PARTICIPANTS IS DISABLED │
│              ("PASSIVE PARTICIPANTS").                   │
└─────────────────────────────────────────────────────────┘
                            ↓                            72
┌─────────────────────────────────────────────────────────┐
│ IN THE EVENT THE ACTIVE PARTICIPANT HAS NOT COMPLETED THEIR │
│ COMMENTS, BUT WISHES TO CONTEMPORANEOUSLY COMMUNICATE    │
│ WITH THE PASSIVE PARTICIPANT, THE ACTIVE PARTICIPANT CAN SELECT │
│     THE HEAR BUTTON TO "HEAR" OTHER PARTICIPANT(S).      │
└─────────────────────────────────────────────────────────┘
                            ↓                            73
┌─────────────────────────────────────────────────────────┐
│ WHEN THE ACTIVE PARTICIPANT DOES NOT DESIRE TO           │
│ CONTEMPORANEOUSLY COMMUNICATE WITH THE PASSIVE           │
│ PARTICIPANT(S), THE ACTIVE PARTICIPANT UNSELECTS THE HEAR │
│    BUTTON TO MUTE THE PASSIVE PARTICIPANT(S).            │
└─────────────────────────────────────────────────────────┘
```

HEAR PASSIVE PARTICIPANT FLOWCHART

FIG. 17

RAISE HAND (REQUEST MICROPHONE) FLOWCHART

FIRST USER STATUS INDICATOR PACKET

SECOND USER STATUS INDICATOR PACKET

THIRD USER STATUS INDICATOR PACKET

SYSTEM TO FACILITATE FACTUALLY ACCURATE ONLINE DEBATES

TECHNICAL FIELD

The present invention generally relates to systems and methods for implementing an online debating platform.

BACKGROUND INFORMATION

The ability to debate a topic or issue is a fundamental need in modern society. Debates function to help people dissect and evaluate difficult ideas. Debates also function to provide the listening audience insight into the minds and opinions of the debate participants.

SUMMARY

In a first novel aspect, a system to facilitate factually accurate online debates includes a storage device, a processor communicatively coupled to the storage device, a first means for causing a first device to display a first user interface that includes a pass the microphone button that when selected causes the ability to communicate to be transferred from a first user to a second user, a second means for causing a second device to display a second user interface that includes a request the microphone button that when selected causes a microphone indicator to be displayed on the first user interface indicating that the second user has requested the ability to communicate, and a third means for causing a third device to display a third user interface includes an add a flag button that when selected causes a create flag form to be displayed on the third user interface.

In a second novel aspect, the first means for causing a first device to display a first user interface is a network interface circuit configured to send a first user status indicator.

In a third novel aspect, the second means for causing a second device to display a second user interface is a network interface circuit configured to send a second user status indicator.

In a fourth novel aspect, the third means for causing a first device to display a third user interface is a network interface circuit configured to send a third user status indicator.

In a fifth novel aspect, a method includes (a) causing a first user interface screen to be displayed on a first user device, (b) causing a second user interface screen to be displayed on a second user device, (c) receiving a pass the microphone indicator from the first user device, and (d) in response to (c), transferring an ability to communicate from the first user device to the second user device.

In a sixth novel aspect, a method includes (a) causing a first user interface screen to be displayed on a first user device, (b) causing a second user interface screen to be displayed on a second user device, (c) receiving a hear opponent indicator from the first user device, and (d) in response to (c), contemporaneously granting both the first user device to and second user device an ability to communicate.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 17 is a flowchart diagram of a hear the passive participant process.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Currently there are many problems with debates. These problems are present in scholastic debates, and even presidential debates. One of these problems is lack of substance. Many debate participants focus more on rhetoric and soundbites than substantive policy discussions. Debate participants often spend more time attacking their opponents than discussing their own plans and ideas. Yet another problem is oversimplification. Debate participants can often oversimplify complex issues, leading to a lack of nuance and depth in discussions of the issue. This can lead to unrealistic expectations and solutions that do not adequately address the underlying issues. Another problem is lack of diversity. Political debates often feature a limited range of perspectives and experiences, which can exclude important voices and issues. This can lead to a lack of representation and understanding of different communities and their needs.

Another problem is time constraints. Debates are often constrained by time limits, which can limit the depth and breadth of discussions. Candidates may not have enough time to fully explain their positions or engage in meaningful dialogue with each other. Another problem is that debate participants frequently talk over one another, which prevents the viewing audience and the opposing debate participant from understanding what is being said by each debate participant. Another problem is that debate participants often make false statements of fact or false assumptions on which their arguments are based. These false statements of fact or false assumptions degrade the value of the subsequent debate dialog.

A new debate platform is needed to address these debate problems so as to provide a more understandable and valuable discussion that results in a more meaningful and useful result.

Figure 1:
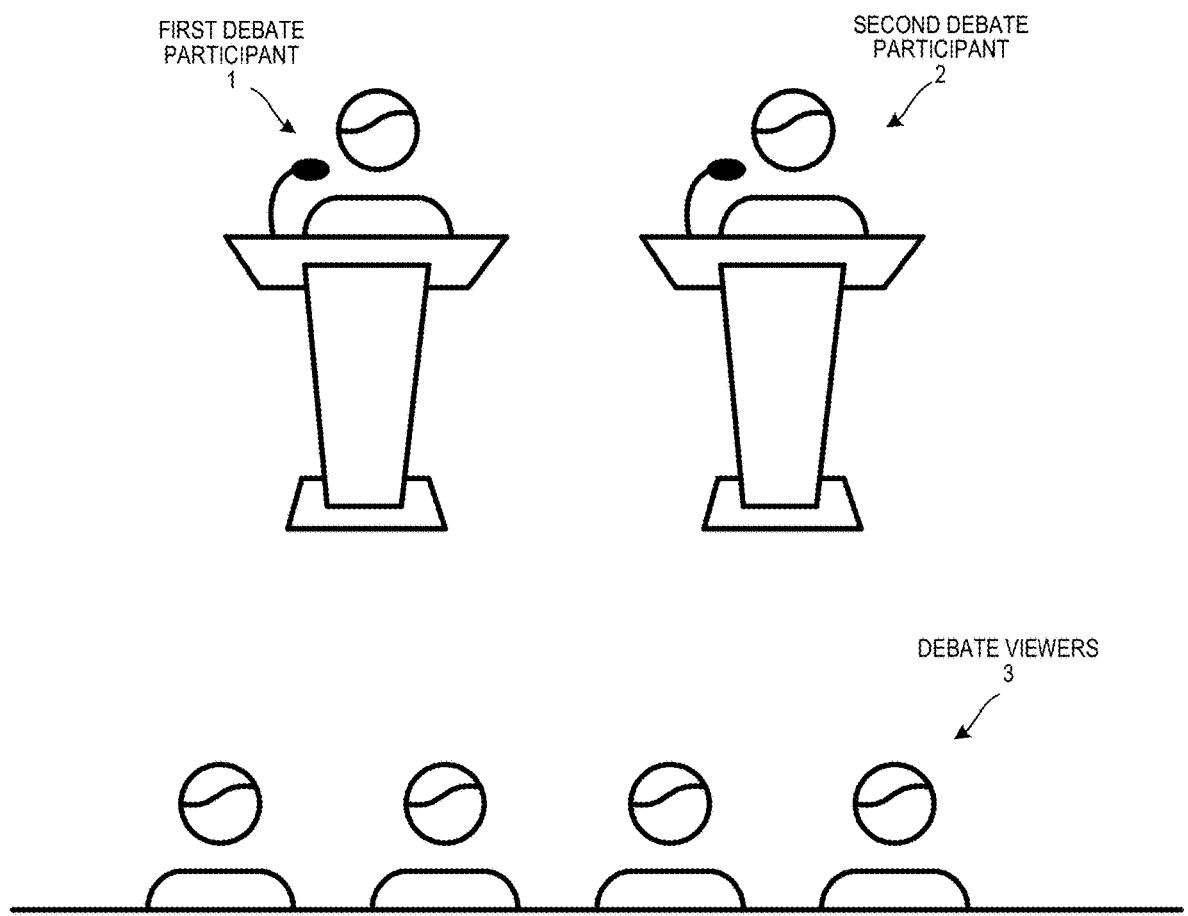
FIG. 1 is a diagram of two debate participants debating in front of a group of debate viewers.

FIG. 1 is a diagram of two debate participants debating in front of a group of debate viewers. A debate includes, but is not limited to, at least two debate participants, first debate participant 1 and second debate participant 2. The debate is viewed by debate viewers 3. Ideally, the debate participants discuss one topic at a time, do not talk over each other, allow each other sufficient time to discuss their points and only assert factually accurate facts and assumptions.

Figure 8:
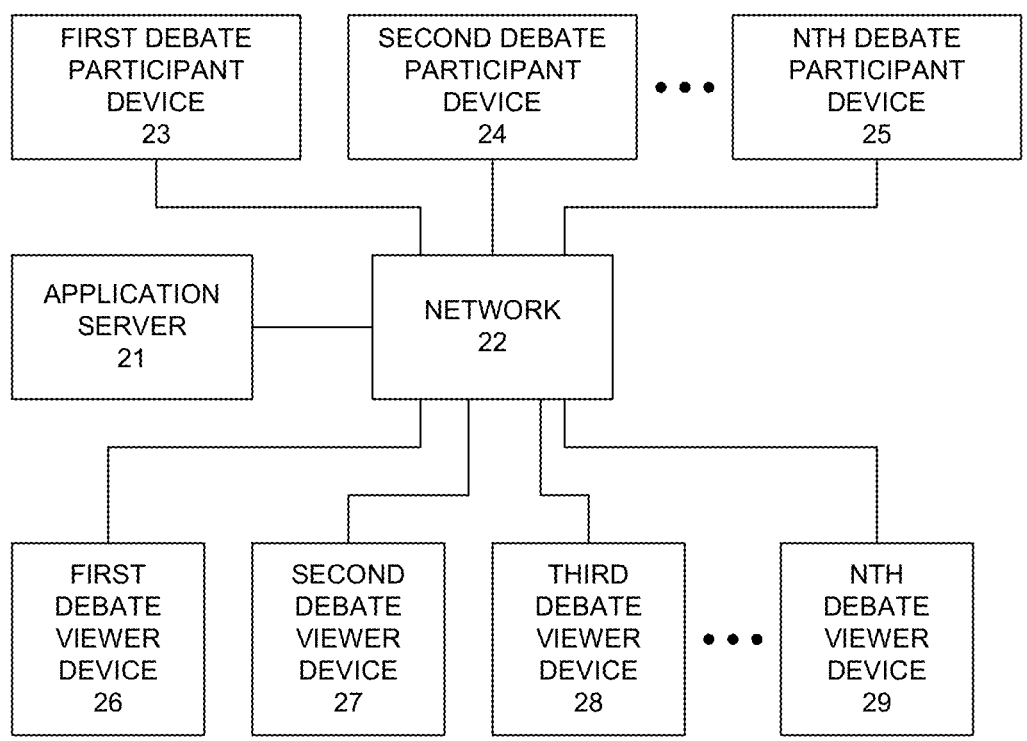
FIG. 8 is a diagram of a debate system architecture.
Figure 14:
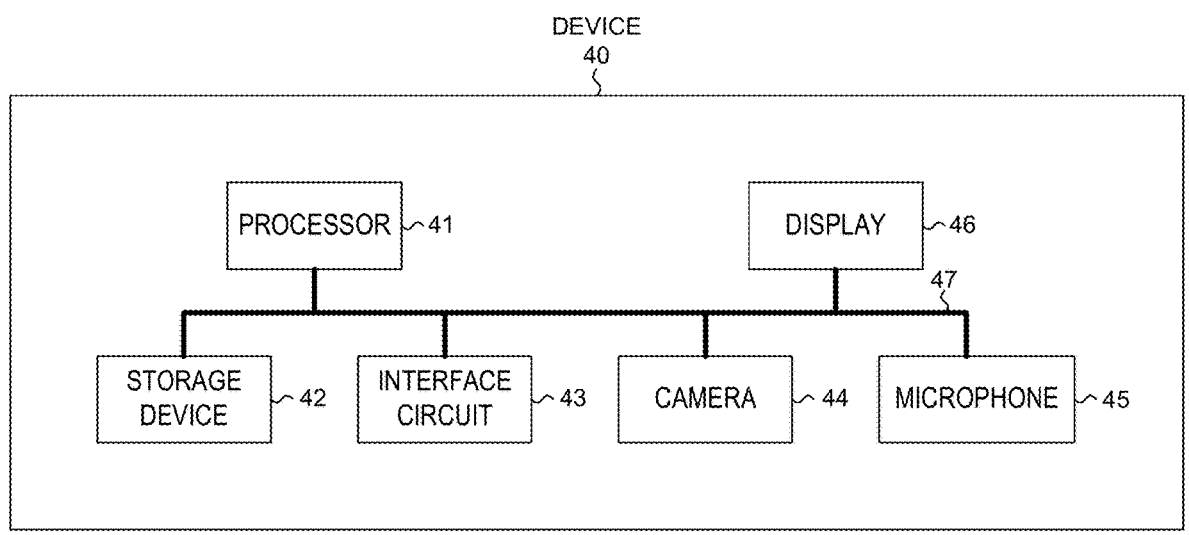
FIG. 14 is a hardware diagram of a user device.

While the illustration of FIG. 1 depicts people physically conducting a debate within hearing distance from each other, the debate platform described and claimed in the present application is a digital platform to allow for virtual debates where the debate participants and debate viewers are located at different locations and are only able to interact through a device, such as a mobile device, desktop computing device, a laptop computing device or tablet device. The debate system architecture utilized in one embodiment is illustrated in FIG. 8. An application server 21 stores and operates the debate platform system. The application server 21 communicates via a network 22. The network 22 can be any network, such as the world wide web internet network. The debate participants interact with the debate platform via debate participant devices 23-25. The debate viewers interact with the debate platform via debate viewer devices 26-29. The number of debate participants and the number of debate viewers is not limited to a fixed number, rather any number of debate participants or debate viewers may use the debate platform. An example of the hardware components included in a device are illustrated in FIG. 14. In one embodiment, the device 40 includes a processor 41, a storage device 42, an interface circuit 43, a camera 44, a microphone 45 and a display 46. The device 40 also includes a bus 47 through which the various device components can communicate.

Figure 2:
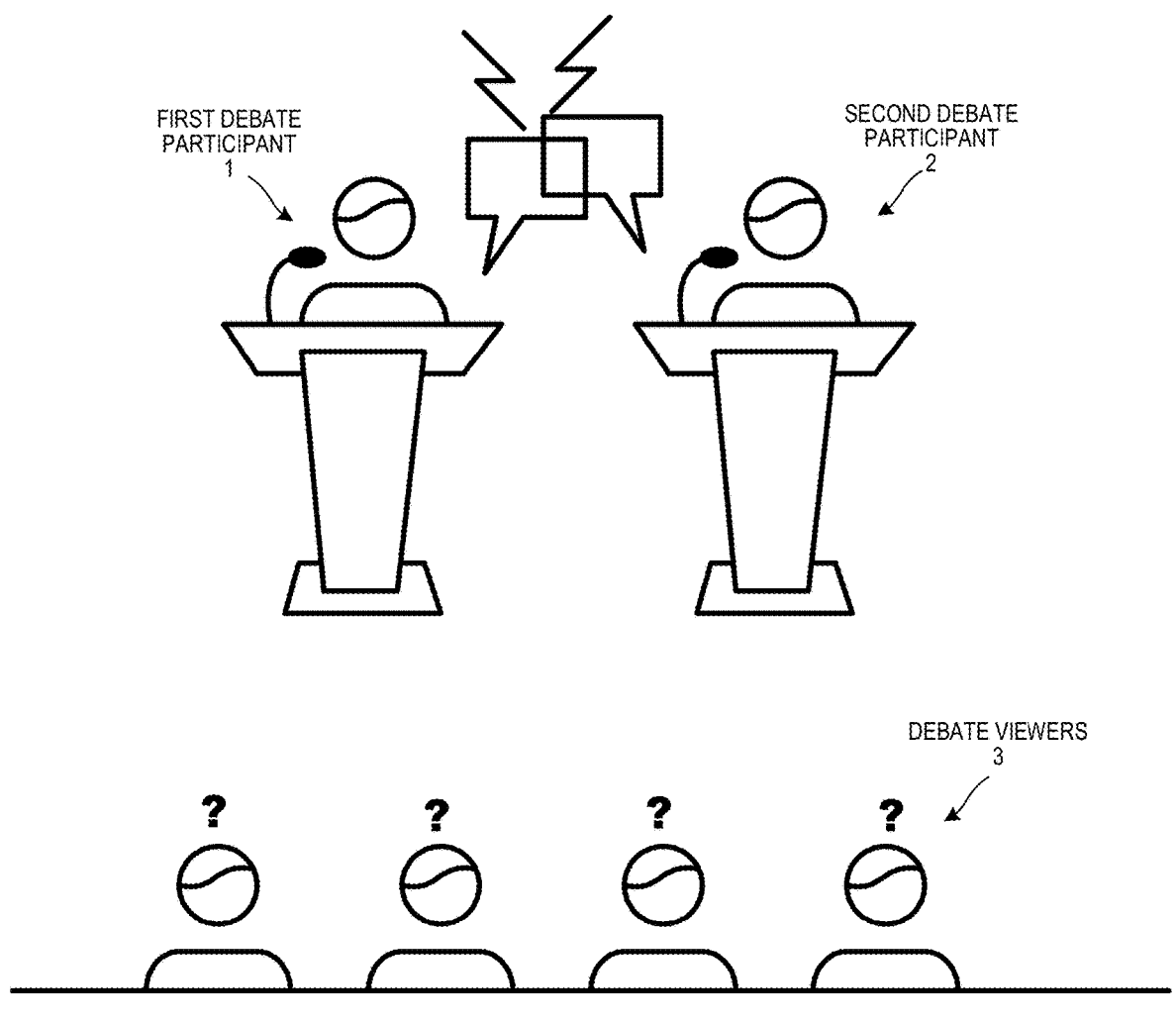
FIG. 2 is a diagram of two debate participants talking contemporaneously in front of a group of debate viewers.

FIG. 2 is a diagram of two debate participants talking contemporaneously in front of a group of debate viewers. First debate participant 1 and second debate participant 2 are both speaking contemporaneously. When more than one debate participant speaks, or communicates, at the same time, it is difficult to understand what either debate participant is saying. Moreover, when more than one debate participant speaks at the same time, it is virtually impossible for each debate participant to understand what the other debate participant is saying. As a result of the contemporaneous speaking, neither debate participant is listening to what the other debate participant is saying and the debate viewers 3 are confused as to what any of the debate participants are trying to communicate.

Figure 3:
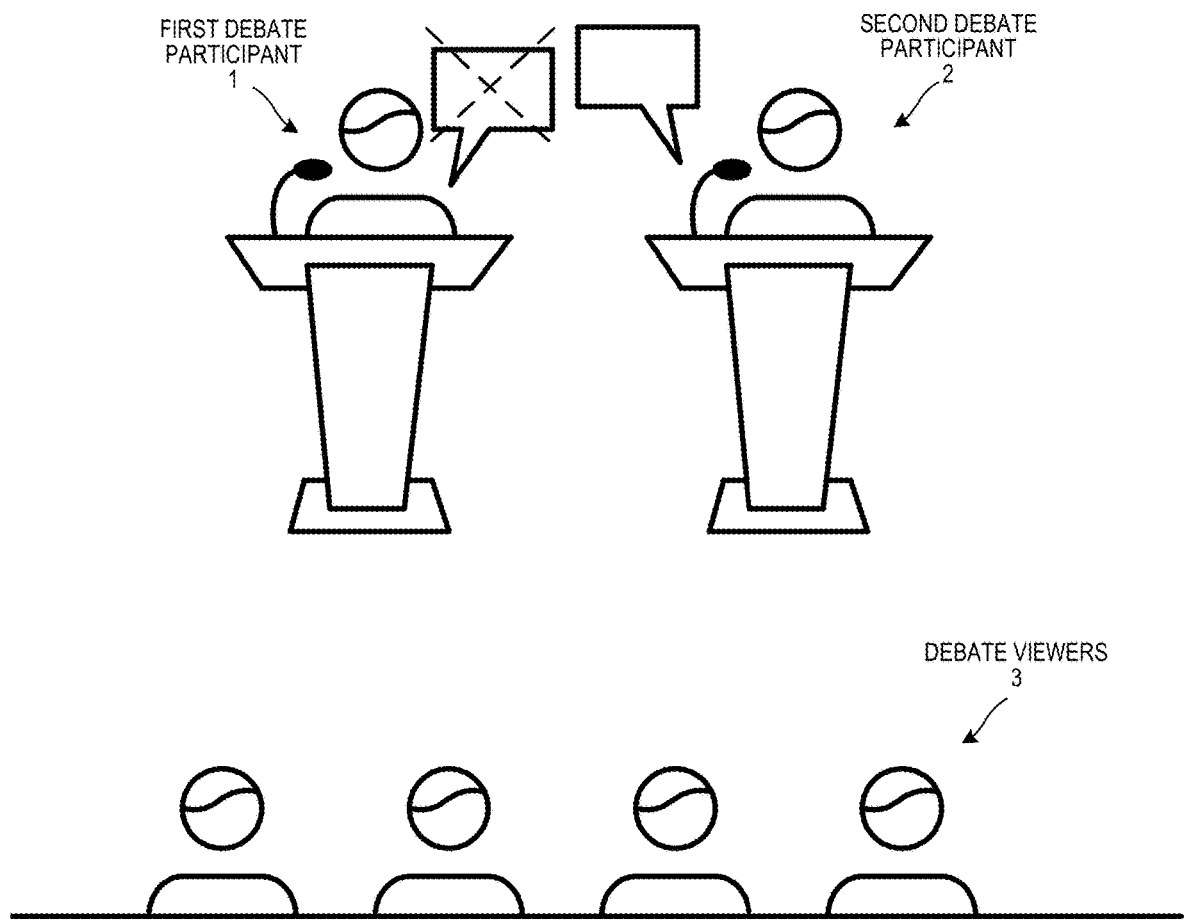
FIG. 3 is a diagram of two debate participants talking contemporaneously in front of a group of debate viewers, while the microphone of the first debate participant is muted.
Figure 9:
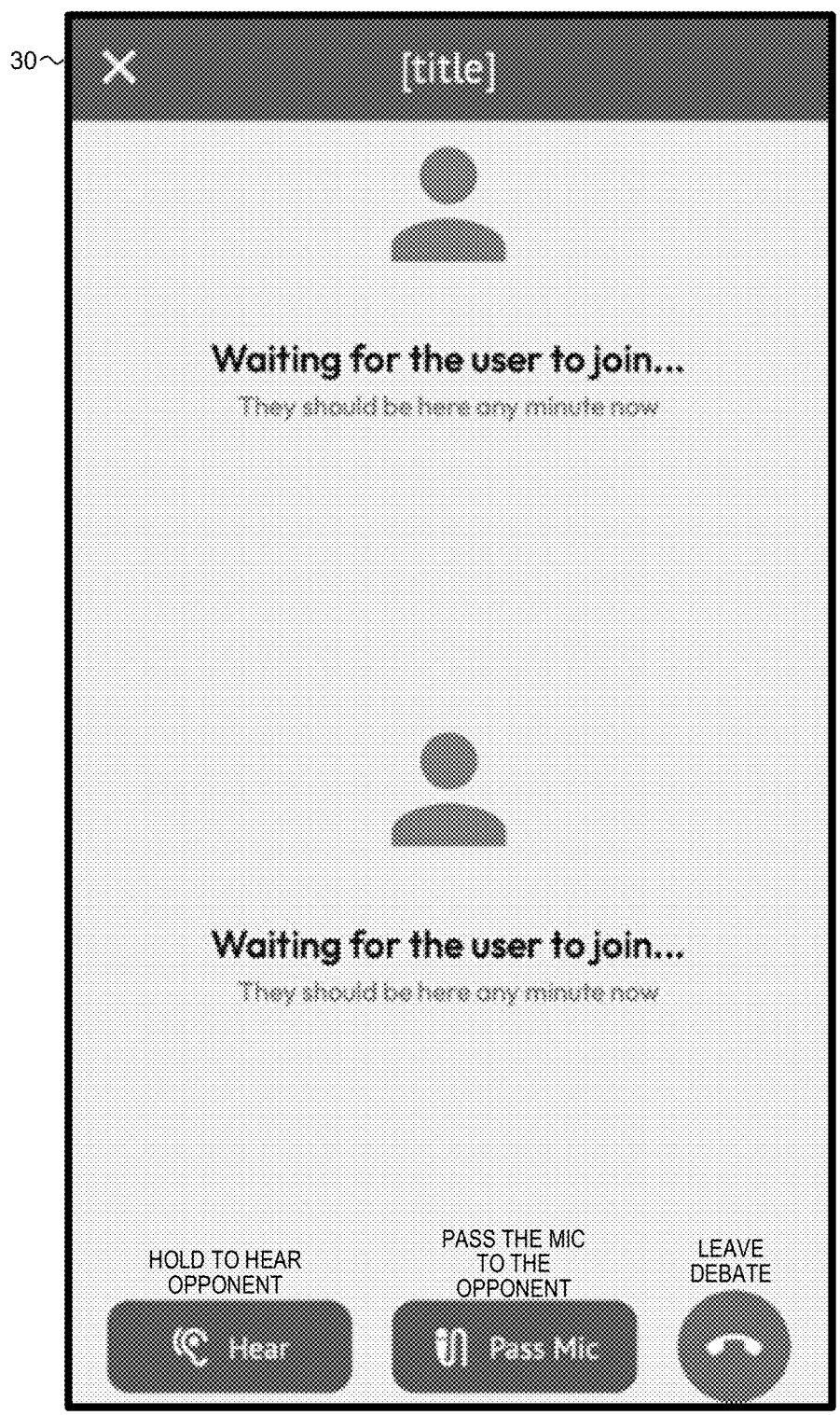
FIG. 9 is a diagram of an active debate participant user interface.

FIG. 3 is a diagram of two debate participants talking contemporaneously in front of a group of debate viewers, while the microphone of the first debate participant is muted. This situation is similar to the crosstalk of debate participants described in FIG. 2, however, in FIG. 3 the notion of microphone passing is introduced. The notion of microphone passing entails that only one debate participant may "have the microphone" at any moment in time. As will be discussed in greater detail below, that debate participant may choose to share or give the microphone to another debate participant, but only one debate participant "has the microphone" at any single moment in time. In the illustrated example of FIG. 2, first debate participant 1 and second debate participant 2 are both speaking at the same time. Second debate participant 2 "has the microphone". The phrases "has the microphone" and "having the microphone" are used herein to describe the notion of a debate participant having the unique ability at any given time to be heard by the other debate participants as well as the debate viewers while the reverse is not true. In this scenario, the second debate participant 2 has not elected to allow the first debate participant 1 to communicate to the debate viewers 2 nor other debate participants. As a result, the potential crosstalk caused by both the first debate participant 1 and the second debate participant 2 speaking at the same time is prevented. While the first debate participant 1 is speaking contemporaneously with the second debate participant 2, the speech of debate participant 1 is not being transmitted to the debate viewers 3 nor the second debate participant 2. This allows for the debate viewers 3 to clearly understand what the debate participant 2 is communicating without the distraction and interruption of the first debate participant's 1 voice. This further allows the second debate participant 2 to clearly communicate his thoughts without interruption by the first debate participant 1. The first debate participant 1 will be able to communicate to the other debate participants and the debate viewers once the second debate participant 2, who has the microphone, passes the microphone to the first debate participant 1. In one embodiment, the second debate participant 2 is able to pass the microphone to the first debate participant 2 via an active debate participant user interface 30 as illustrated in FIG. 9. Via the user interface 30, the debate participant that has the microphone can select the "Pass Mic" button to pass the microphone to the first debate participant 1. Once the microphone has been passed to the first debate participant 1, debate participant 2 is no longer able to communicate with the other debate participants nor the debate viewers.

Figure 4:
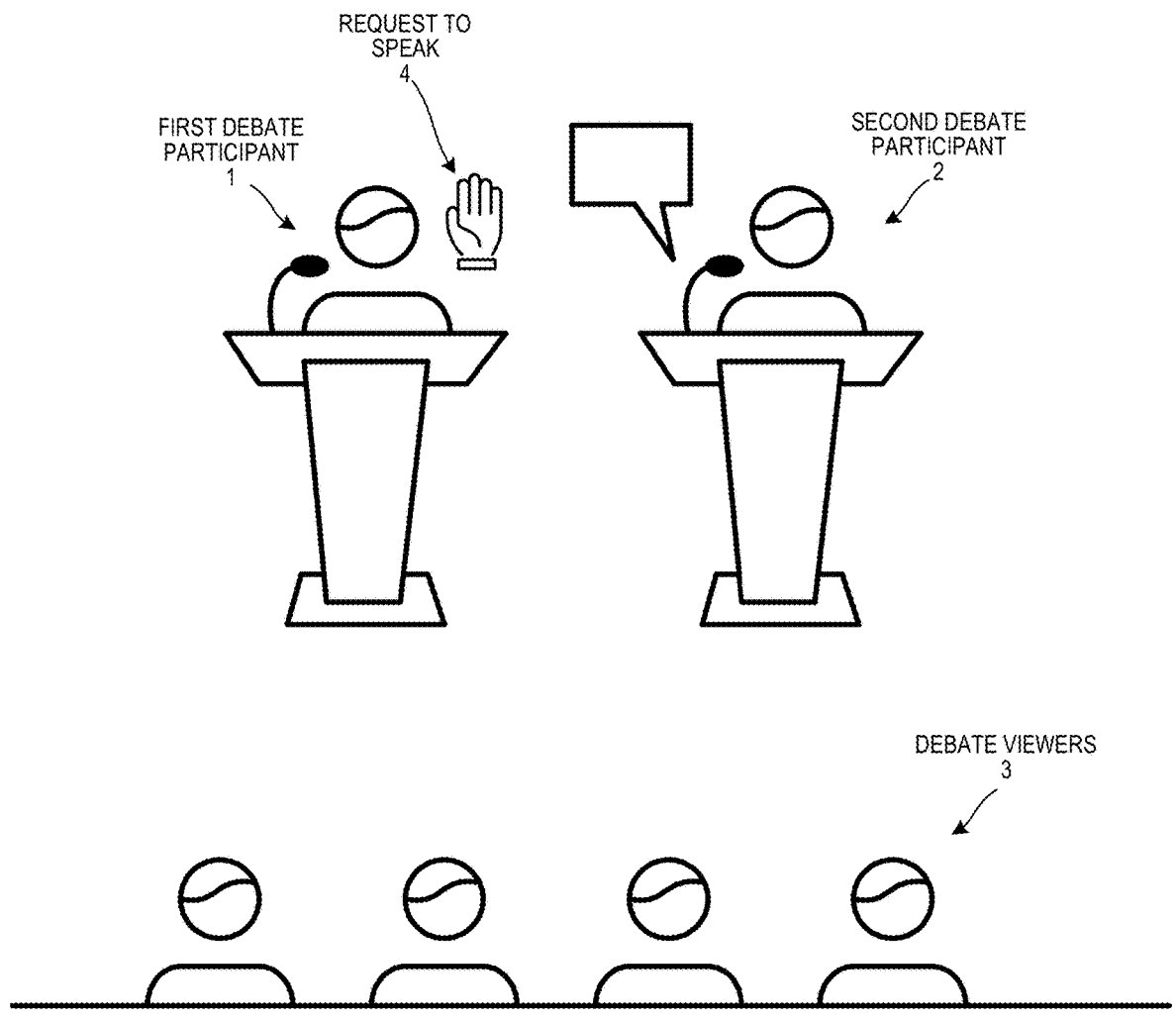
FIG. 4 is a diagram a debate participant "raising a hand" to request microphone access.
Figure 10:
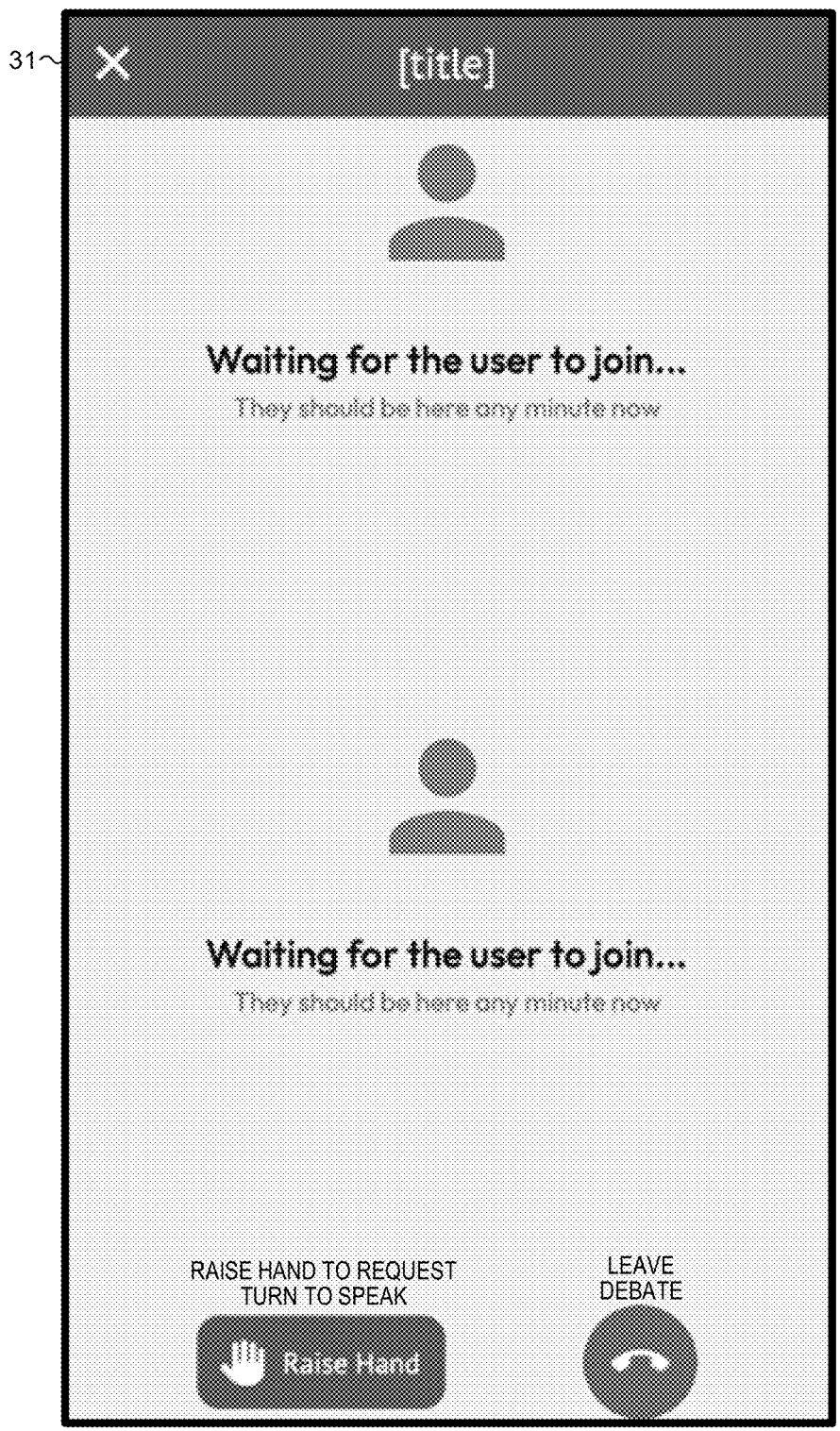
FIG. 10 is a diagram of a passive debate participant user interface.

FIG. 4 is a diagram of a debate participant "raising a hand" to request microphone access. While the second debate participant 2 has the microphone the first debate participant 1 may have the desire to make a comment with respect to what the second debate participant 2 is saying. Since the first debate participant 1 does not have the microphone, he does not have the ability to communicate his voice to the second debate participant 2 nor the debate viewers 3. To allow the first debate participant the chance to voice his thoughts, the first debate participant may "raise his hand" to request the opportunity to voice his thoughts. The phrase "raise his hand" is used herein to describe the notion of a debate participant requesting an opportunity to voice his thoughts when that debate participant does not have the microphone. In one embodiment, the first debate participant may raise his hand by selecting a "raise hand' button on an inactive debate participant user interface 31, as is illustrated in FIG. 10. When the first debate participant 1 raises his hand, a notification is provided to the second debate participant 2 who has the microphone. The notification may be visual and/or audible. For example, the notification may illustrate a hand on a user interface displaying on the second debate participant's device. In another example, the notification may be a sound or phrase audible inserted into the audio stream received by the second debate participant's device. In response to receiving the notification, the second debate participant 2 has two options: (i) accept the request or (ii) ignore the request.

Figure 5:
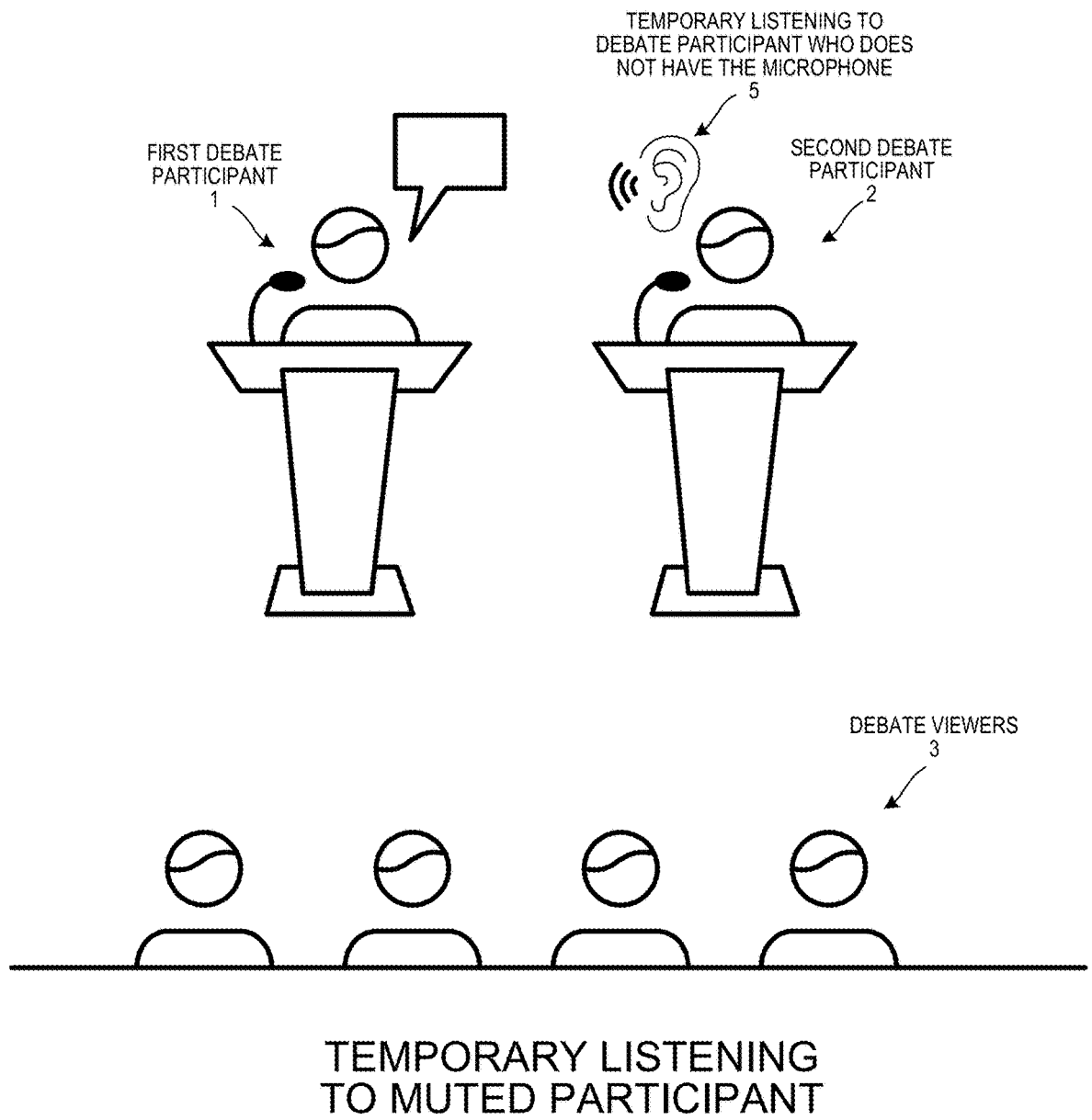
FIG. 5 is a diagram of a debate participant with microphone access temporarily sharing microphone access with another rebate participant who does not have microphone access.

In the first scenario is illustrated in FIG. 5. The second debate participant 2 accepts the request and grants the first debate participant 1 to communicate his voice to the debate viewers 3 and the second debate participant 2 by selecting the "hear" button. The word "hear" is used to describe the notion of hearing the comments of the other debate participant who has requested to speak by "raising his hand". In one embodiment, the second user may grant the request by selecting a "hear" button on an active debate participant user interface 30. This granting of the first debate participant 1 to communicate his voice is only provided while the second debate participant 2 has selected the "hear" button to grant the request. For example, when the second debate participant 2 unselects the hear button, the first debate participant 1 is no longer able to communicate his voice to the debate viewers 3 nor the second debate participant 2. This functionality allows for the second debate participant 2 who is holding the microphone the ability to "hear" the first debate participant's 1 comments for a limited duration of his choosing without surrendering complete control of the microphone and ending his turn to speak. While the first debate participant 1 has been granted the ability to communicate his voice the second debate participant 2 also maintains his ability to share his voice as well. This provides the ability for both the first debate participant 1 and the second debate participant 2 to have a back and forth discussion so long as the second debate participant 2 allows it.

Figure 6:
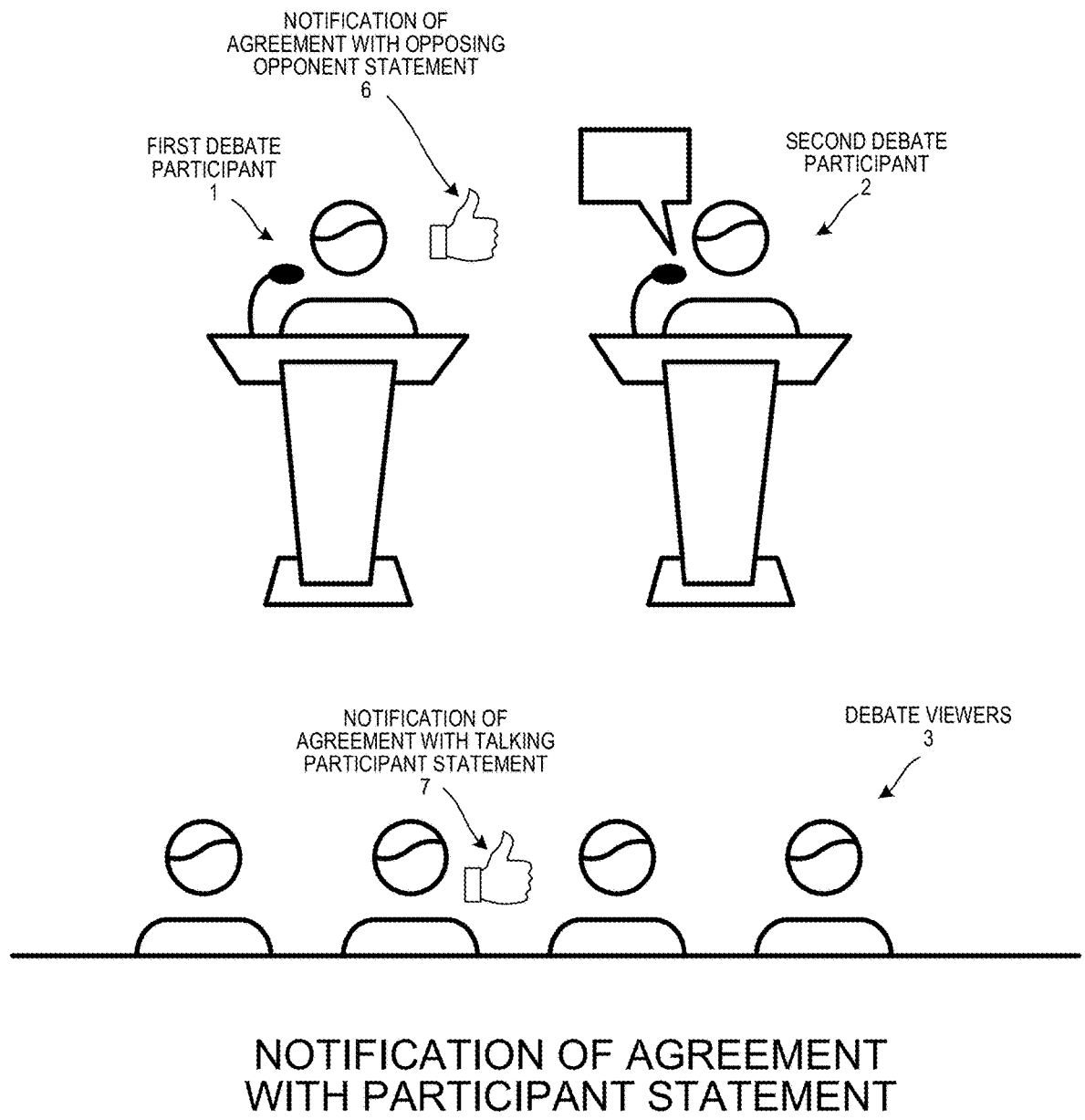
FIG. 6 is a diagram illustrating communication of agreement with a debate participant statement.

FIG. 6 is a diagram illustrating communication of agreement with a debate participant statement. During a debate a debate viewer or another debate participant may agree with what the currently speaking debate participant is saying. In this scenario, the debate viewer 3 and/or debate participant can provide an "agree" notification to show that they agree with the speaking debate participant's comments. This may function to inform that speaking debate participant that their point has been made and accepted and therefore does not require any further explanation or discussion.

Figure 7:
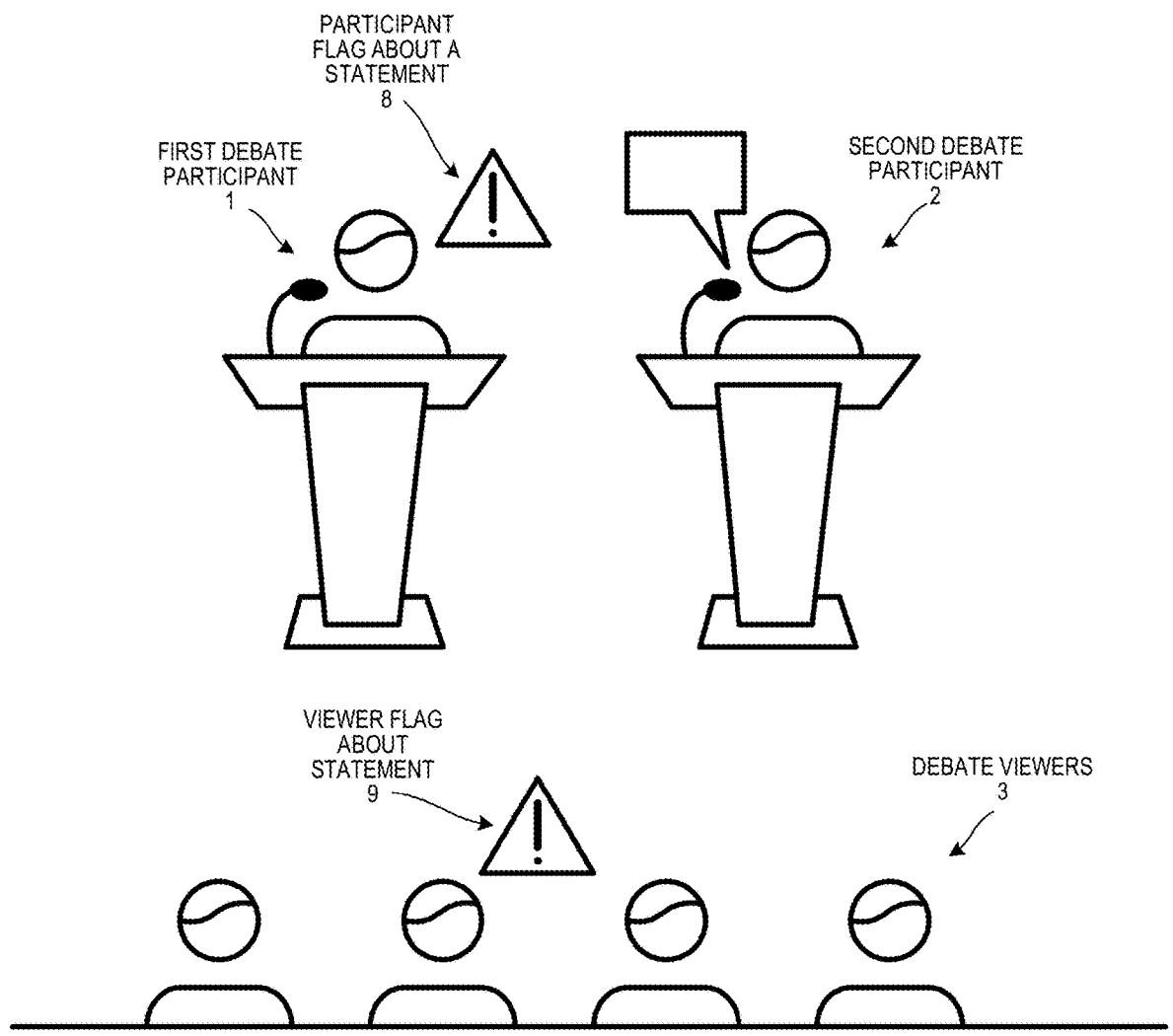
FIG. 7 is a diagram illustrating a submitted flag regarding a debate participant statement.
Figure 11:
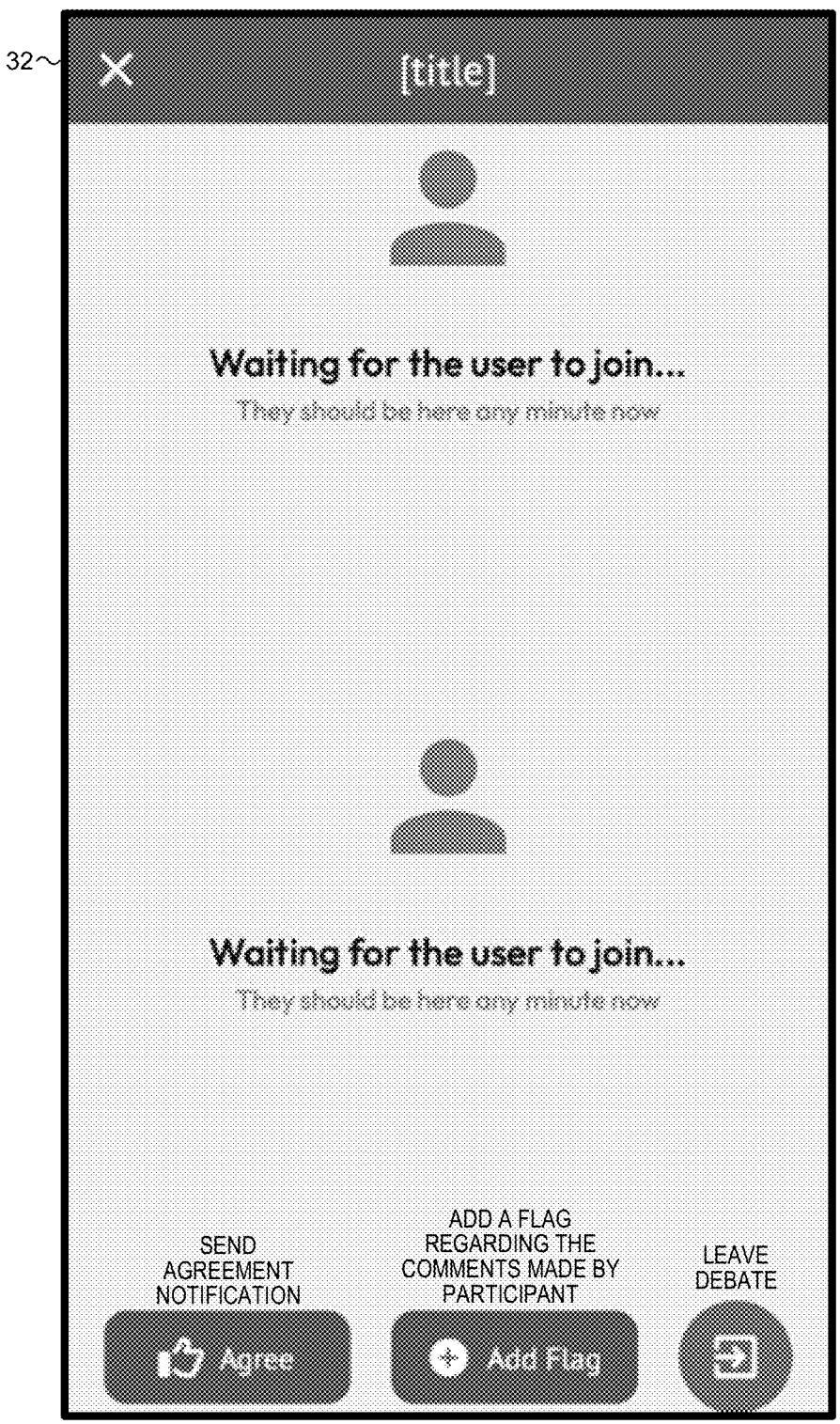
FIG. 11 is a diagram of a debate viewer user interface.

FIG. 7 is a diagram illustrating a submitted flag regarding a debate participant statement. During a debate a debate participant may make an assumption, statement of fact, or logical deduction that is not correct. This may be intentional or accidental. Either way, it is important for the validity and value of the debate that these fallacies be noted and hopefully corrected. The notion of creating a flag is provided by the debate platform to allow either a debate viewer or a debate participant to create a flag about a comment that was made. A debate viewer or debate participant may select an "add a flag" button to create a flag describing the fallacy observed. In one embodiment, a debate viewer can select an "Add Flag" button on a debate user interface 32, as is illustrated in FIG. 11. Note this "add flag" button is also included in the debate participant user interfaces in other embodiments. After selection of the "Add Flag" button, the user will be directed to a flag creation form.

Figure 12:
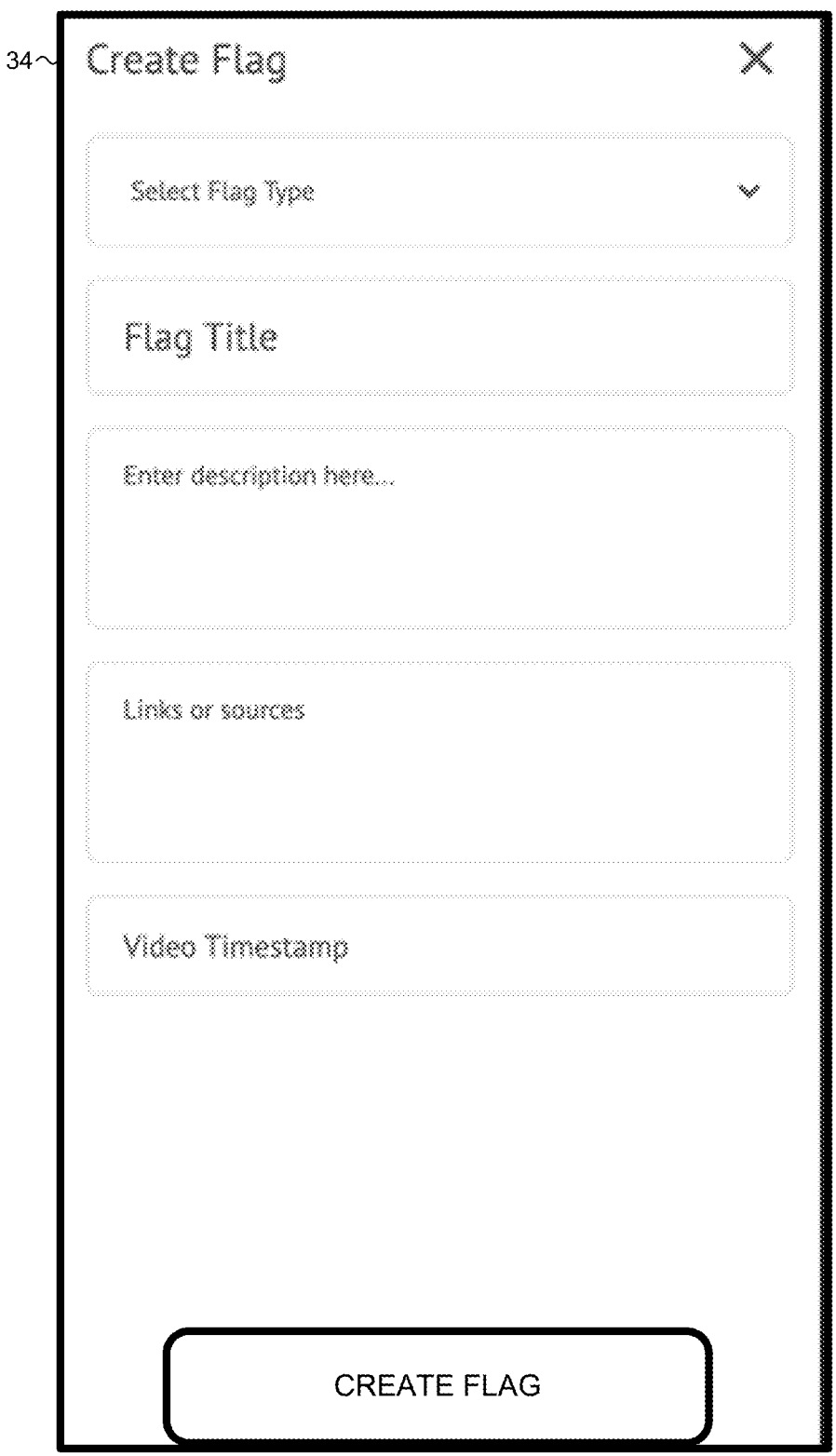
FIG. 12 is a diagram of a flag creation form user interface.

FIG. 12 is a diagram of a flag creation form user interface 34. The flag creation form user interface 34 includes a select flag type drop down menu, a flag title text entry field, an enter description field, a link or sources description field and a video time stamp field. The select fly type drop down menu contains options such as false assumption, logical fallacy, false statement of fact. The flag title is a brief description of the flagged statement. The description field where the complete description of the flagged issues is entered. The links or sources field where links to or source for support to of the flagged issue is entered, so to provide support for the flag. The video timestamp is a time stamp to identify the statement to which the flag is referring to. Once all of the create flag form details are filled out, the create flag button can be selected to submit the flag.

Figure 13:
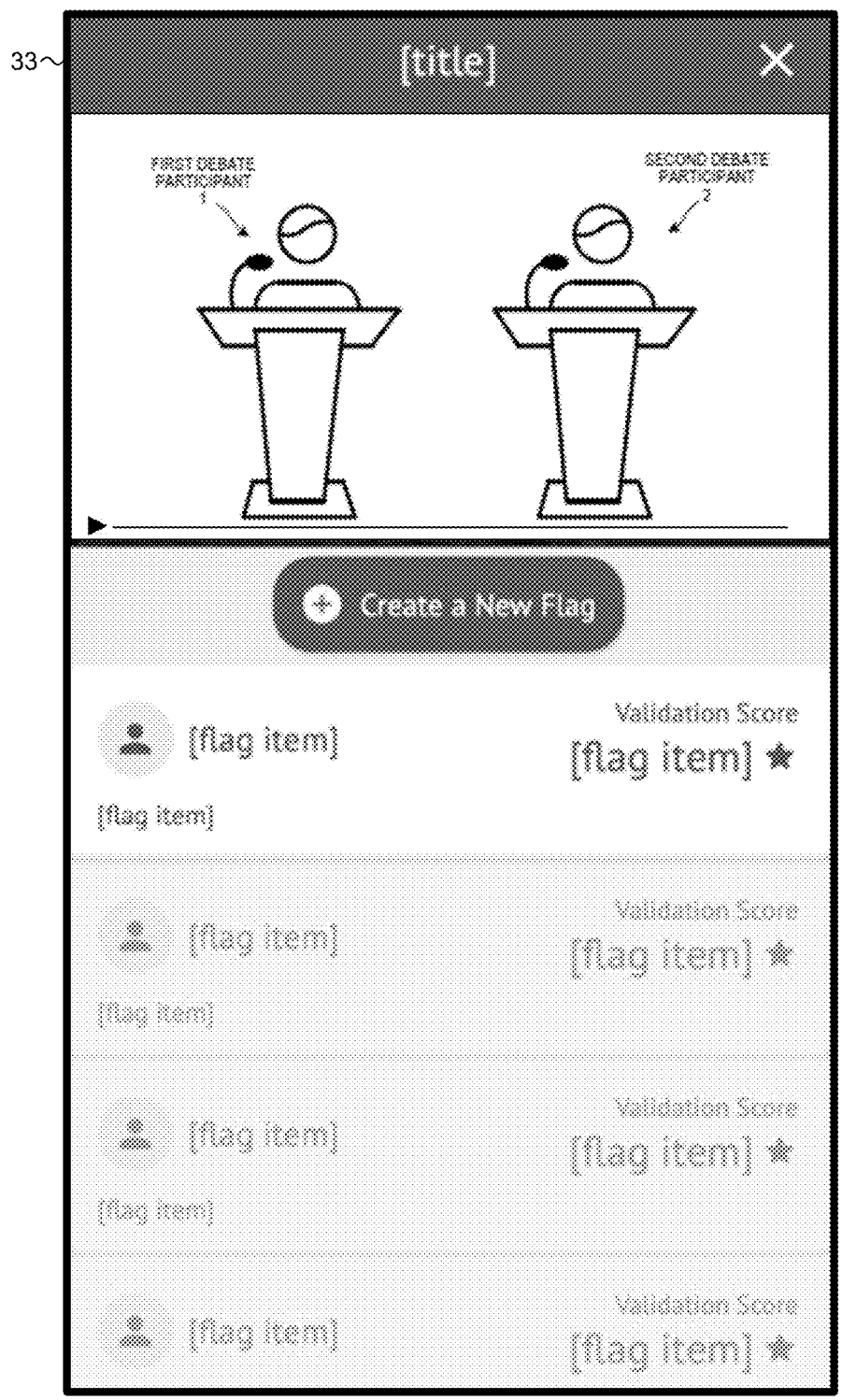
FIG. 13 is a diagram of a flag listing user interface.

FIG. 13 is a diagram of a flag listing user interface. During a debate a flag listing is displayed on the debate viewer and/or debate participant's user interface. The flag listing illustrated a listing of all flags submitted during the debate. If there are more flags then can be listed in a single display height, then the list of flags may be scrollable. Any of the listed flags can be selected to view the contents of listed flag. Moreover, each of the flags can be ranked and given a validity score by debate viewers who did not submit the flag. The overall average validity score may also be displayed on the flag listing, so to provide an indication as to how other debate viewers agree or disagree with the flag. In this manner, the debate platform provides a useful and easy way to flag possible false statements or logically incorrect arguments by debate participants. This also improves the understanding of debate viewers who may not notice the fallacy but for seeing the flag created by another debate viewer.

Figure 15:
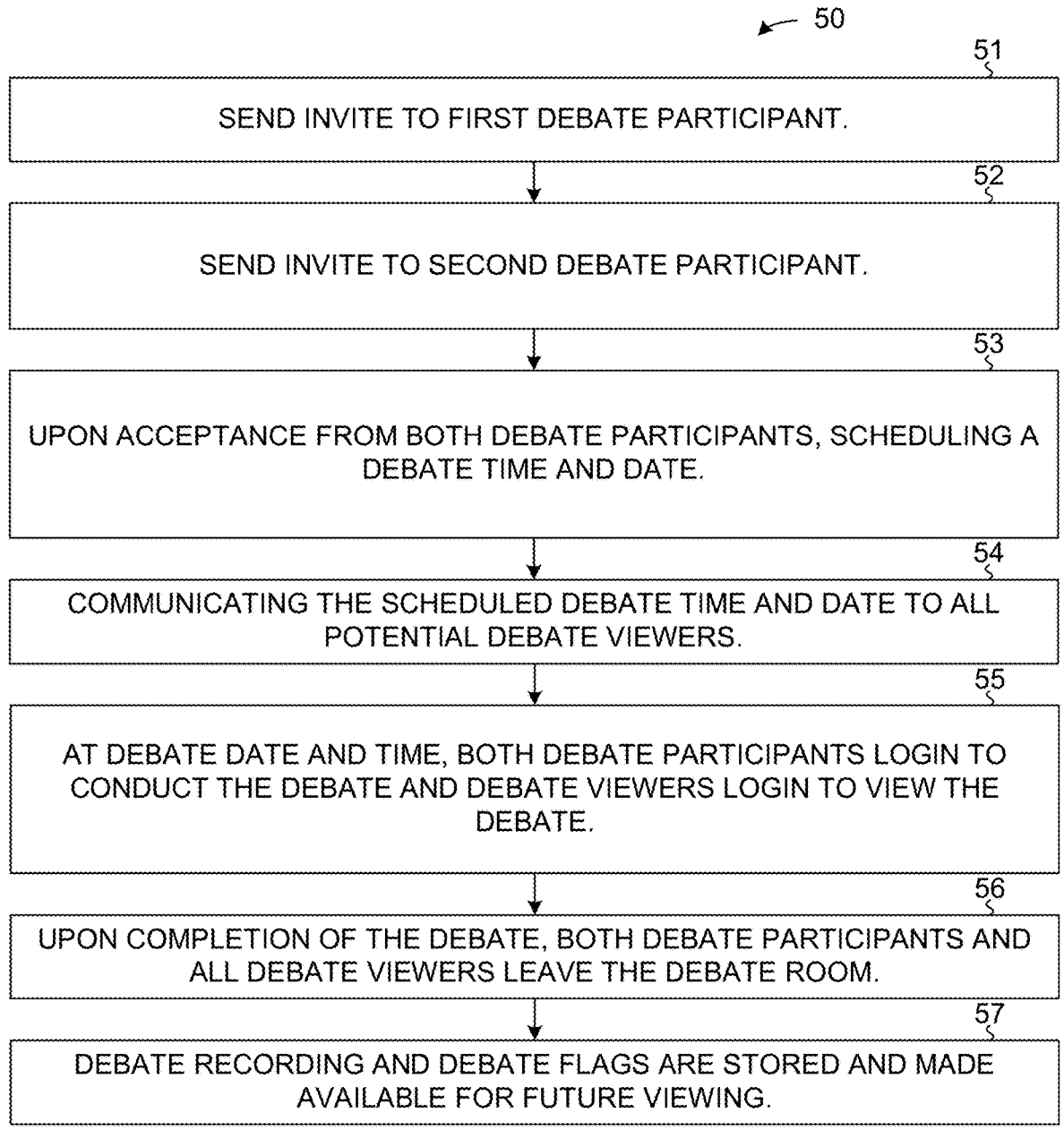
FIG. 15 is a flowchart diagram of a debate creation process.

FIG. 15 is a flowchart 50 diagram of a debate creation process. In step 51, an invite is sent to a first debate participant. In step 52, an invite is sent to a second debate participant. In step 53, upon acceptance from both the first and second debate participants, a debate time and date is scheduled. In step 54, the scheduled debate time and date is communicated to all potential debate viewers. In step 55, upon the debate date and time, both debate participants login to conduct the debate and the debate viewers login to view the debate. In step 56, upon completion of the debate, both debate participants and all debate viewers leave the debate room. In step 57, a debate recording and all debate flags are stored and made available for future viewing. In this manner, a future debate can be created, scheduled, conducted, and preserved for future viewing along with all submitted flags.

Figure 16:
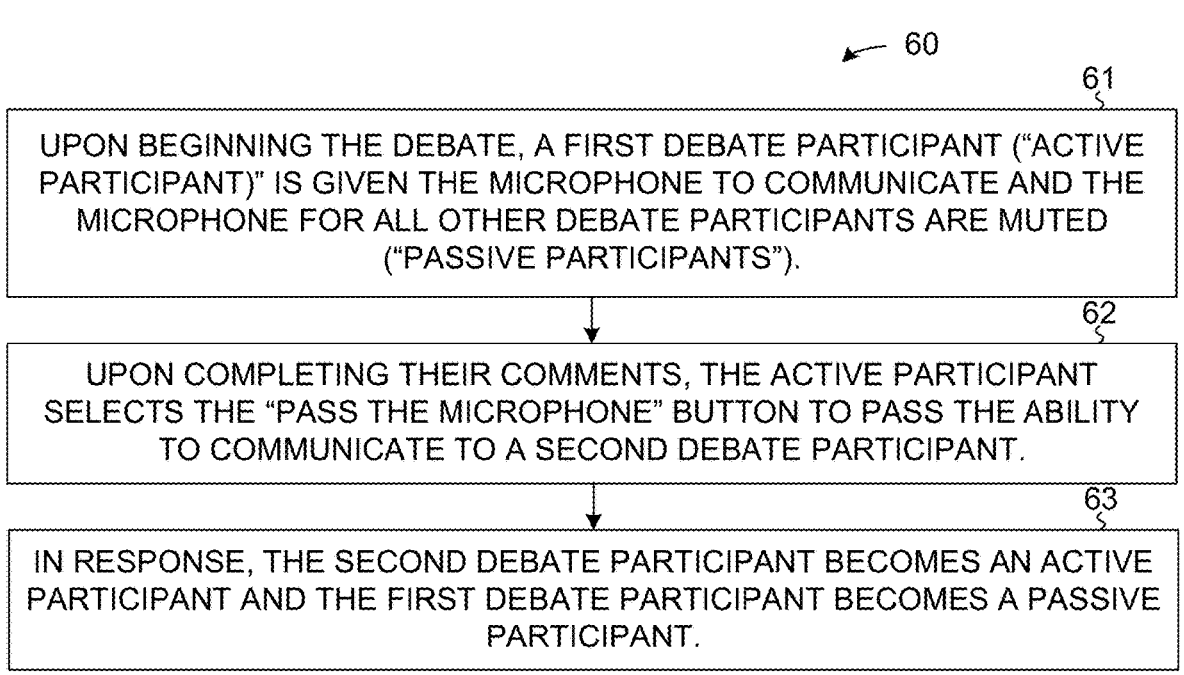
FIG. 16 is a flowchart diagram of a pass the microphone process.

FIG. 16 is a flowchart 60 diagram of a pass the microphone process. In step 61, upon beginning the debate, a first debate participant becomes an active participant when he is given the microphone to communicate and simultaneously the microphones of all other debate participants are muted. The muted debate participants are herein referred to as "passive debate participants". In step 62, upon completing their comments, the first debate participant ("the active participant") selects a "pass the microphone" button to pass the ability to communicate to a second debate participant. The first debate participant then loses the ability to communicate, and the first debate participants microphone become muted. In step 63, in response to the microphone being passed, the second debate participant becomes an active participant and has the ability to communicate to the other debate participants and the debate viewers.

FIG. 17 is a flowchart 70 diagram of a hear the passive participant process. In step 71, upon beginning the debate, a first debate participant is given the microphone and becomes an active participant. With the microphone the first debate participant is able to communicate with all other debate participants and debate viewers. The microphone for all other debate participants is muted. In step 72, the first debate participant ("active participant") has not yet completed their comments, however, wishes to temporarily listen to the comments of a passive debate participant. To listen or "hear"

the comments of a passive debate participant, the first debate participant selects a "hear" button on the first debate participant's user interface, thereby allowing all debate participants to communicate contemporaneously by unmuting the microphone of all debate participants. In step 73, when the first debate participant ("active participant") does not wish to hear any further comments from passive participants, the first debate participant can deselect the "hear" button on the first debate participant's user interface, thereby muting the microphone of all passive debate participants. In this fashion, an active participant who has the microphone can unilaterally and temporarily elect to hear the comment of passive debate participants for a temporary duration without having to completely surrender the microphone and terminate their turn in the debate.

Figure 18:
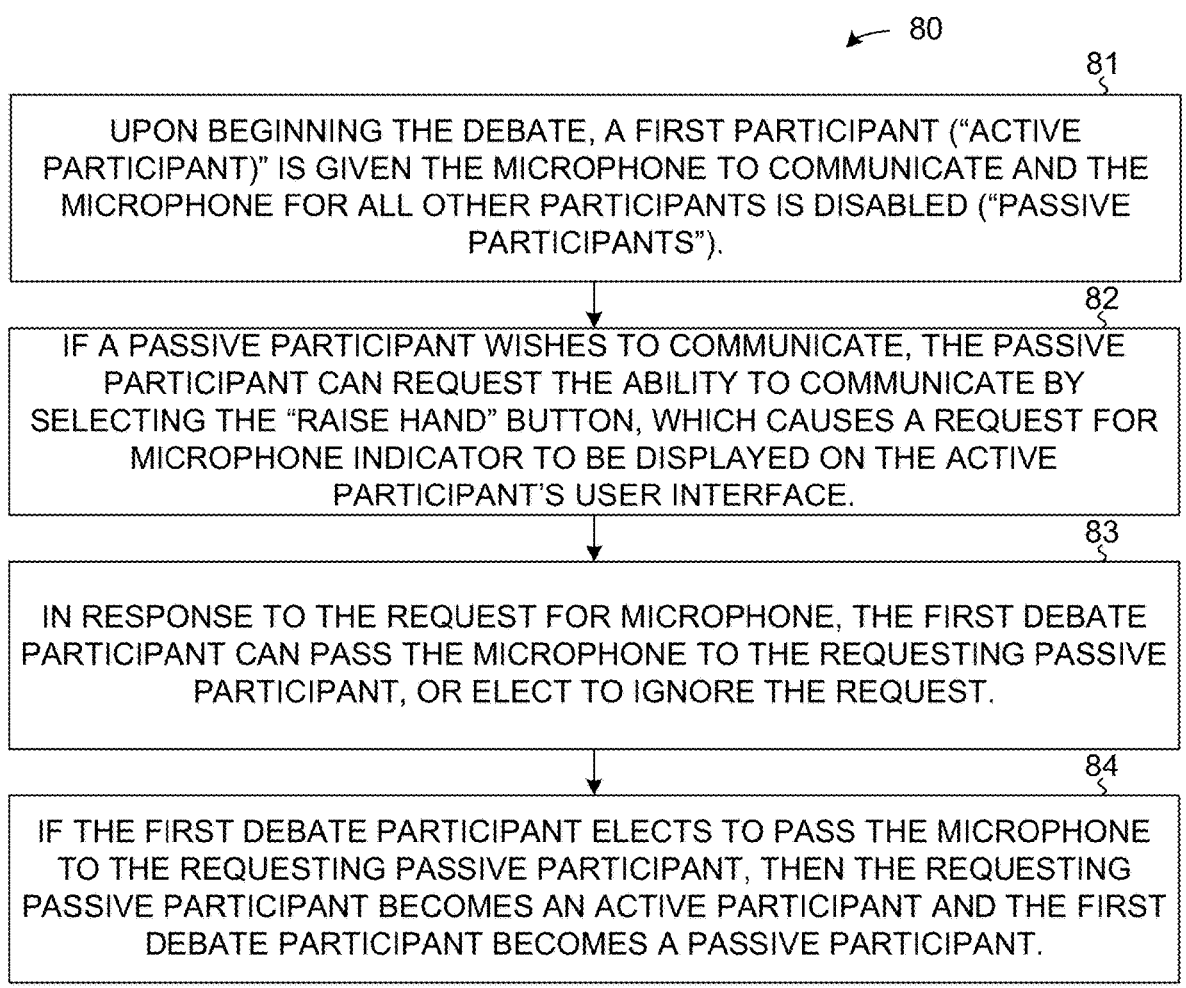
FIG. 18 is a flowchart diagram of a raise hand to request microphone access process.

FIG. 18 is a flowchart 80 diagram of a raise hand to request microphone access process. In step 81, upon beginning the debate, a first debate participant is given the microphone and becomes an active participant. The microphones of all other debate participants are muted. In step 982, in the event that a passive participant wishes to communicate, the passive participant can request the ability to communicate by selecting the "Raise Hand" button, that when selected cause a request for microphone indicator to be displayed on the first debate participant's ("active participant's") user interface. It is noted herein, that the selecting of the "Raise Hand" button may also cause an audible notification to be inserted into the first debate participant's audio stream, thereby providing an audible notification instead of or in addition to a visual notification via a user interface. In step 83, in response to the "Raise Hand" button being selected (request of the microphone so to communicate) the first debate participant can pass the microphone to the requesting passive debate participant or elect to ignore the request. In step 84, if the first debate participant elects to pass the microphone to the passive debate participant, then the first debate participant become a passive participant and their microphone is muted and the requesting passive participant become an active participant and is able to communicate with all debate participants and debate viewers.

Figure 19:
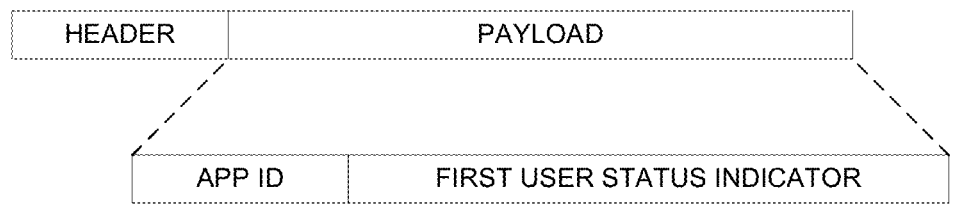
FIG. 19 is a diagram of a first user status indicator packet.

FIG. 19 is a diagram of a first user status indicator packet. In operation, a server hosting the debate platform may communicate with debate participant and debate viewer devices via the internet. This communication may be performed via a wired, wireless or combination of wired and wireless medium, such as WiFi, cellular or ethernet connections. Over the internet connection, the server can send one or more packets of data to each debate participant device and debate viewer's device. In this fashion, the debate platform can control what user interface, as well as what operations are available therein, via an indicator packet that instructs the local program executing on the debate participant's or debate viewer's device. This functionality allows the debate platform to control the assignment of which debate participant is an active participant and which debate participants are passive participants. Further, the debate platform can control what type of requests are available for selection on each debate participant's user interface at different points in time during the debate. As discussed in detail above, those user interfaces and requests vary depending on the status of each debate participant and the actions elected by other debate participants.

Figure 20:
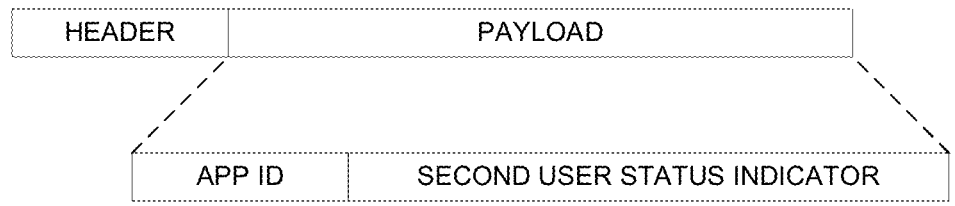
FIG. 20 is a diagram of a second user status indicator packet.
Figure 21:
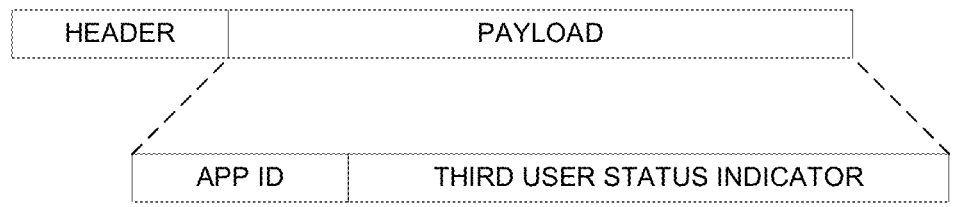
FIG. 21 is a diagram of a third user status indicator packet.

In one embodiment, a first user is an active debate participant, a second user is a passive debate participant, and a third user is a debate viewer. A first user status indicator packet, illustrated in FIG. 19, is sent to the first user's device so to cause the first user's device to display an active debate participant user interface. A second user status indicator packet, illustrated in FIG. 20, is sent to the second user's device so to cause the second user's device to display a passive debate participant user interface. A third user status indicator packet, illustrated in FIG. 21, is sent to the third user's device so to cause the third user's device to display a debate viewer user interface.

Debate System

In one embodiment, computer network technology, such as web sockets, are used to facilitate time synchronization, state synchronization and real-time information exchange between debate participants during a debate. A system includes three main components: a first debate participant client application, a second debate participant client application, and a backend server application. The backend server application enables authentication and authorization of debate participant requests and the backend support for debate synchronization using web sockets. The backend server application is responsible for initializing, managing, and updating the debate state on each client application.

Debate Initiation

In one example, debate initiation phase begins when a debate participant clicks the "Join Debate" button for a selected debate on the user interface of the debate participant client application.

The debate initiation phase involves the following steps:
First, the current time is compared with the scheduled start time of the debate by the client application and only allows joining the debate as a participant within fifteen (15) minutes prior to the start time and within fifteen (15) minutes after the scheduled end time of the debate.
Second, the authentication and authorization component in the backend server application ensures the users are authenticated and authorized to join the debate as a participant.
Third, once authenticated and authorized, a first debate participant client application sends a web socket connection request to the backend server application using the initiation ("INIT") message. Backend server application, after checking the validity of the request, spawns and assigns a web socket thread to the debate and sends a success acknowledgement response back to the first debate participant client application. At this point, a two-way communication channel has been established between the first debate participant client application and the backend server application.
Fourth, the above three steps are repeated for the second debate participant client application until a two-way communication channel is also established between second debate participant client application and backend server application.
Fifth, this channel is now used by the first debate participant client application and the second debate participant client application to send and receive messages between the first debate participant client application and the second debate participant client application through the backend server application for validation and error checking.

Debate Facilitation

The following message formats are used by the first debate participant client application and the second debate participant client application to communicate:

1. INIT—First message that a debate participant client application sends to the backend server application to initiate a web socket connection containing the following key-value pairs:
   a. user_id=<participant_user_id>
   b. debate_id=<debate_id>
   c. oauth_token=<oauth_token>
   d. operation=init_debate
2. START_DEBATE—Once both the first and second debate participant client applications have joined the call, the debate is in the initial free-form conversation state (i.e. no participant is 'holding the mic' yet and open two-way communication is allowed). A button titled "Start Debate" is displayed on the user interface for both debate participant client applications, which when pressed, sends the START-DEBATE message to the backend server application, instructing it to initialize the debate state by assigning the active status to one debate participant client application and passive status to another debate participant client application and resetting the auto_pass_timeout timer. The START_DEBATE message contains the following key-value pairs:
   a. user_id=<user_id_of_user_that_starts_debate>
   b. debate_id=<debate_id>
   c. operation=start_debate
3. PASS_MIC—This message is sent by the active debate participant client application to convey to the backend server application to update the state of the debate to move the active participant client application status to the passive debate participant client application. Upon receipt of this message, the backend server application verifies the state of the debate to check the validity of this message and initiates the pass_mic operation, resets the auto_pass_timeout timer and updates the debate state. This message received from a passive participant client application has no effect and is discarded. The PASS_MIC message contains the following key-value pairs:
   a. user_id=<active_participant_user_id>
   b. debate_id=<debate_id>
   c. operation=pass_mic
4. AUTO_PASS_TIMEOUT—This message is automatically initiated by the debate participant client application in the active participant state when the maximum time of holding the mic has elapsed. The backend server verifies the state of the debate to check the validity of this message and initiates the pass_mic operation. The AUTO_PASS_TIMEOUT message contains the following key-value pairs:
   a. user_id=<active_participant_user_id>
   b. debate_id=<debate_id>
   c. operation=pass_mic
5. HEAR_START and HEAR_STOP—These messages are sent for the purpose of logging only and represent the start and stop moments from the active state debate participant client application (i.e. HEAR_START is sent when the "Hear" button is pressed and held and HEAR_STOP is sent when the "Hear" button is released).

Debate Conclusion

This phase is entered when one of the participants has left the call and the current time is within 15 minutes (before or after) of the scheduled end time of the debate. When the remaining debate participant client application also leaves the call, the debate is terminated and a call to initiate the finalize_recording operation is made.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system to facilitate factually accurate online debates, comprising:
   a storage device;
   a processor communicatively coupled to the storage device;
   a first means for causing a first device to display a first user interface, wherein the first user interface includes a pass the microphone button that when selected causes the ability to communicate to be transferred from a first user to a second user;
   a second means for causing a second device to display a second user interface, wherein the second user interface includes a request the microphone button that when selected causes a microphone indicator to be displayed on the first user interface indicating that the second user has requested the ability to communicate; and
   a third means for causing a third device to display a third user interface, wherein the third user interface includes an add a flag button that when selected causes a create flag form to be displayed on the third user interface, wherein the first means for causing the first device to display the first user interface is a network interface circuit configured to send a first user status indicator, wherein the second means for causing the second device to display the second user interface is the network interface circuit configured to send a second user status indicator, wherein the third means for causing the third device to display the third user interface is the network interface circuit configured to send a third user status indicator, and wherein the first user interface includes a hear opponent button that when selected grants both the first user and the second user the ability to communicate contemporaneously.

2. The system of claim 1, wherein the contemporaneous ability to communicate in response to selecting the hear the opponent button is terminated when the hear the opponent button is unselected.

3. The system of claim 1, wherein the third user interface includes an agree button that when selected causes a notification indicating that the third user agrees with a current statement made by the first user.

4. The system of claim 1, wherein the create flag form includes a flag type field.

5. The system of claim 4, wherein the flag type field is a logical fallacy, inaccurate information, inappropriate content, an argument based on false assumption, or a user attack.

6. The system of claim 1, wherein the flag form includes a flag title, a flag description, a link to a source or a description of a source, wherein the source supports the rationale of the flag.

7. The system of claim 1, wherein the create flag form includes a video timestamp that indicates a temporal position in the debate to which the flag being created is relevant.

8. The system of claim 1, wherein the create flag form includes a create flag button that when selected causes a flag to be created.

9. The system of claim 1, wherein a listing of all flags created is displayed on the third user interface.

10. The system of claim 9, wherein each of the flags listed on the third user interface is selectable.

11. The system of claim 10, wherein the flag title, the flag description, the link to the source or the description of source is displayed on the third user interface in response to selecting one of the flags listed on the third user interface.

12. The system of claim 1, wherein the first user interface, the second user interface, and the third user interface include a leave debate button that when selected causes the first user, the second user, or the third user to exit the debate.

* * * * *